United States Patent [19]

Fernlund

[11] 4,280,743

[45] Jul. 28, 1981

[54] DOUBLE-ROW SPHERICAL ROLLER BEARING

[75] Inventor: Ingemar Fernlund, Hindås, Sweden

[73] Assignee: SKF Industries, Inc., King of Prussia, Pa.

[21] Appl. No.: 7,671

[22] Filed: Jan. 30, 1979

[30] Foreign Application Priority Data

Feb. 6, 1978 [SE] Sweden ................................. 7801322

[51] Int. Cl.³ .............................................. F16C 33/50
[52] U.S. Cl. ..................................... 308/217; 308/214
[58] Field of Search ............... 308/217, 214, 241, 235, 308/DIG. 8; 277/141, 96.2

[56] References Cited

U.S. PATENT DOCUMENTS

| 2,375,085 | 5/1945  | Curtis ........................... 277/96.2 |
| 2,615,767 | 10/1952 | Wallgren ....................... 308/214 |
| 3,346,264 | 10/1967 | Hamm ........................... 277/141 |
| 3,456,952 | 7/1969  | Prasse et al. .................. 277/141 |
| 3,694,043 | 9/1972  | Tellson .......................... 308/214 |

Primary Examiner—Lenard A. Footland
Attorney, Agent, or Firm—Eugene E. Renz, Jr.

[57] ABSTRACT

A double row spherical roller bearing having symmetrical rollers (3) guided in a retainer (5), which is centered on the inner race ring (2) of the bearing without the intermediary of any guiding ring or flange, but by aid of the retainer side portions (6), which engage the said inner race ring at positions outside the two rows of rollers (3).

9 Claims, 6 Drawing Figures

DOUBLE-ROW SPHERICAL ROLLER BEARING

The present invention refers to double row spherical roller bearings, particularly such, which have symmetrical rollers guided by the race tracks.

Double row spherical roller bearings are intended to take up radial as well as axial loads. There are different types of such bearings, e.g. one type which have non-symmetrical rollers and a fixed guiding flange on the inner race ring between the roller rows, and another type which have symmetrical rollers and a loose guiding ring between the roller rows instead of the fixed guiding flange.

In the case with non-symmetrical rollers these rollers when subjected to radial load will constantly press against the fixed guiding flange due to their non-symmetric shape, which will result in friction and heat release.

In the case with symmetrical rollers and a loose guiding ring, these rollers will not constantly engage the loose guiding ring. The rollers are in this case guided by the race tracks and an axial force will only push the roller rows somewhat to the side (i.e. axially), whereby the loose guiding ring will also follow. The guiding of the rollers in this manner is further described in Swedish Pat. No. 365,852.

Figure 1:
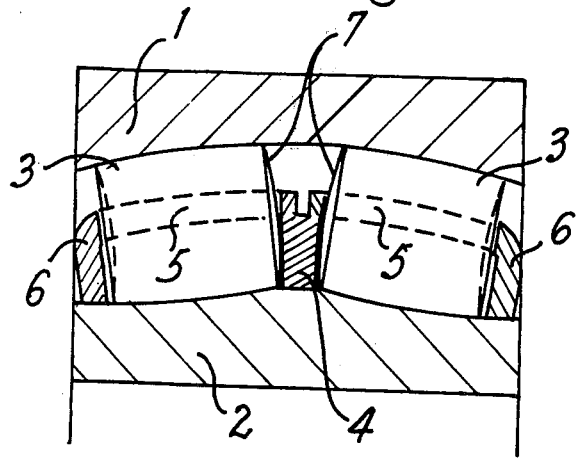

In FIG. 1 of the drawings is shown a double row spherical roller bearing in section, having a loose guiding flange in accordance with the above. The bearing comprises an outer race ring 1 having a raceway 1a and an inner race ring 2 having raceways 2a between which are arranged spherical, symmetrical rollers 3. The loose guiding ring 4 is shown between the roller rows 3. The retainer 5 is, as can be seen in the figure, divided into two halves 5a, 5b, which both rest against the guiding ring 4. The retainer halves are of the so-called window type, whereby the rollers are arranged in the "windows." The outer side of the retainer halves is a ring 6 which extends down towards the inner race ring. In order that the rollers shall get a favourable contact against the guiding ring their end surfaces 7 facing the guiding ring have been made spherical. Friction forces with subsequent heat release will appear between the guiding ring, the rollers and the retainer halves resting on the guiding ring.

In order to simplify the design shown in FIG. 1 and described hereabove the guiding ring 4 is, according to the invention, completely eliminated and the retainer 6 is redesigned and hereby is obtained a double row spherical roller bearing with symmetrical rollers which are race track guided, and which roller bearing is characterized thereby that the retainer is designed to be centered against the inner race ring by contact against this at the outside of the roller rows.

In order to be able to withstand a long time of wear it is appropriate that the retainer contact surfaces against the inner race ring are hardened e.g. by carbonitriding.

When the retainer consists of two havles such as shown in FIG. 1, these retainer halves will become too loose and moveable in absence of a guiding ring, whereby according to the invention a clamping ring has been arranged between the roller rows and which clamping ring is adapted to press either outwards or inwards.

The clamping ring may be coated with serrated or non-serrated plastic material, rubber or the like on the side engaging the retainer halves.

The clamping ring may be slotted in a plane perpendicular to the centre axis or it can be slotted mainly axially.

The clamping ring which as stated above may press outwards or inwards against the retainer halves, may be provided with resilient tongues.

With the clamping ring described hereabove the retainer halves will be displaceable relative to each other. If a completely rigid retainer is wanted it is however possible that the halves can be connected to each other by welding or soldering the clamping ring to the retainer halves between the roller rows, and it is of course also possible to interconnect the retainer halves directly in this manner without the use of a clamping ring.

The retainer may also be made in one piece.

According to a further embodiment of the invention it is possible that one of the retainer halves can be pushed into the other retainer half. It is then appropriate to provide one of the retainer halves with a collar or tongues which can extend over a portion of the other retainer half.

As a result of the elimination of the guiding ring 4 the end surfaces of the rolling bodies can be plane.

The invention will hereinafter be further described with reference to FIGS. 2-6 of the accompanying drawings.

Figure 2:
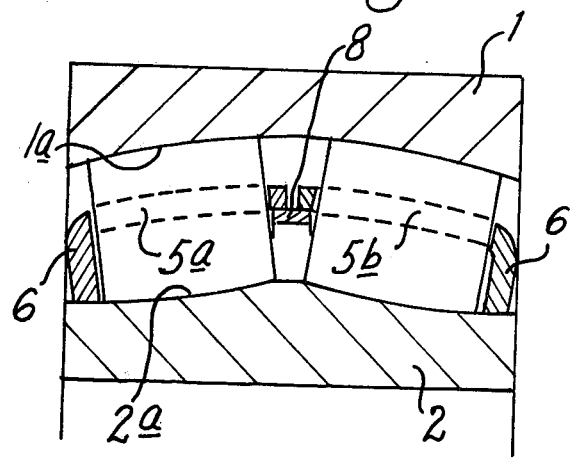
Figure 3:
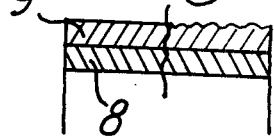
Figure 4:
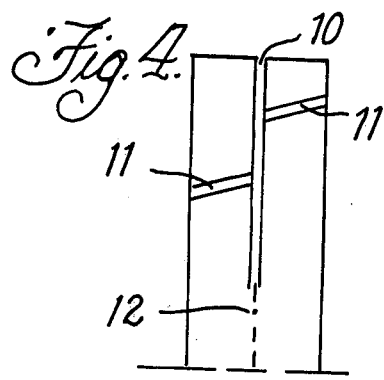
Figure 5:
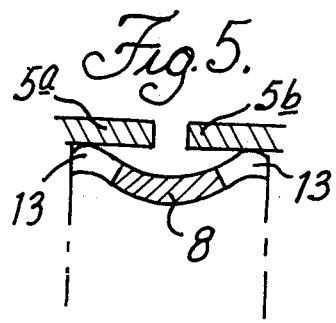
Figure 6:
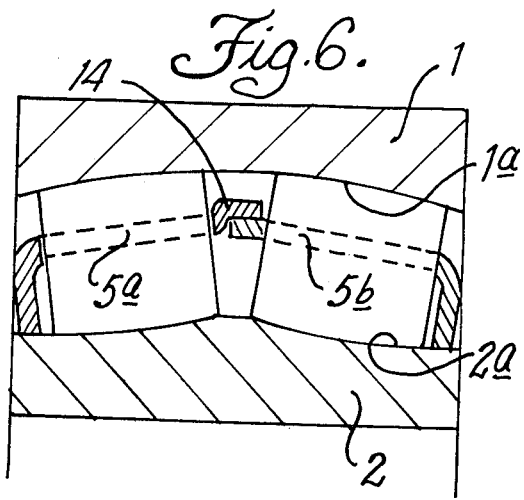

FIG. 2 shows a bearing with a clamping ring;
FIG. 3 shows a section through a clamping ring;
FIG. 4 shows a clamping ring as seen from the side;
FIG. 5 shows a further design of a clamping ring in cross-section; and
FIG. 6 shows a further modification of the invention.

As can be seen in FIG. 2 the retainer halves 5a, 5b are centered against the inner race ring 2 by the side rings 6 engaging it. Between the retainer halves 5a, 5b is shown the clamping or locating ring 8, which in this case presses the retainer halves outwards. As mentioned above it is also possible that the clamping ring 8 presses inwards in which case it of course lies on the outside of the retainer halves. There is no need of a heavy pressure from the clamping ring, but ordinary press fit will in most cases be appropriate. The clamping ring may in section be somewhat arc-formed whereby the retainer halves can be snapped onto the ring.

Such as shown in FIG. 3 the clamping ring 8 may also be provided with a resilient surface 9 e.g. of rubber or plastic material. The resilient surface may be smooth or serrated.

FIG. 4 shows the clamping ring with a slot 10 in a plane perpendicular to the centre axis. In addition to this slot 10 the clamping ring may also have a slot 11 extending mainly axially. For making the slot 10 it is possible to use two annular pieces which are soldered or welded together at 12.

FIG. 5 shows a clamping ring 8 provided with tongues 13, which press against the retainer halves 5a, 5b.

FIG. 6 finally shows a bearing in which the retainer halves have been pushed into each other. One of the retainer halves 5a has been provided with a collar 14 which grips around the other retainer half.

The advantages with the present invention are primarily that there is no need to use any loose guiding ring, which of course means a big material saving and also saving of working costs, and that the roller ends can be plane, as they shall not engage any ring or the like. This simplification in manufacture will give a considerable cost saving. Both roller ends will thereabove become similar, and the assembly will thereby become more simple.

In addition to the above advantages of the invention obtained by the simple manufacture it is also obtained a lower friction in the bearing as the contact points against the guiding ring are eliminated. The friction generated when the retainer is guided against the inner race ring is very small, and the heat released thereby, is generated in the outer region of the bearing and can consequently be transferred away easily.

The invention is not limited to the embodiments shown but can be varied in different manners within the scope of the claims.

What is claimed is:

1. A double row spherical roller bearing having inner and outer rings (1, 2) with confronting raceways (1a, 2a) and a plurality of rollers (3) arranged into two rows in the annular space between the raceways, said rollers being symmetrical, a retainer (5) having a plurality of pockets for circumferentially spacing the rollers in each row adapted to be centered with respect to the inner raceway (2a) by portions (6) which depend from the outer edges of the retainer and contact the inner raceway axially outwardly of the rows of rollers, said retainer comprising two halves (5a, 5b) held together by a locating ring (8) arranged between the rows of rollers spaced radially from the inner raceway (2a) adapted to contact and urge said retainer halves (5a, 5b) in a radial direction.

2. A double row spherical roller bearing as claimed in claim 1 wherein the peripheral surface of said locating ring (8) confronting and engaging said retainer halves (5a, 5b) is coated with a resilient material.

3. A double row spherical roller bearing as claimed in claim 2 wherein said resilient material is plastic and the peripheral surface is serrated.

4. A double row spherical roller bearing as claimed in claim 1, characterized thereby, that the surfaces of the retainer (5), which centre against the inner race ring (2) are surface hardened e.g. by carbonitriding.

5. A double row spherical roller bearing as claimed in claim 1, characterized thereby, that the clamping ring (8) is slotted in a plane (10) perpendicular to the centre axis.

6. A double row spherical roller bearing as claimed in claim 1, characterized thereby, that the clamping ring (8) is slotted mainly axially (11).

7. A double row spherical roller bearing as claimed in claim 1, characterized thereby, that the locating ring (8) is provided with resilient tongues (13), which engage the retainer halves (5a, 5b).

8. A double row spherical roller bearing as claimed in claim 1, characterized thereby, that the retainer halves (5) are interconnected by means of a locating ring (8) soldered or welded thereto and arranged between the roller rows (3).

9. A double row spherical roller bearing as claimed in claim 1, characterized thereby, that the end surfaces (7) of the rollers are plane.

* * * * *